Feb. 19, 1924.

J. F. REARDON

FAUCET

Filed Jan. 12, 1922

1,484,079

Inventor:
John F. Reardon,
by Pippy Kingsland
His Attorneys.

Patented Feb. 19, 1924.

1,484,079

UNITED STATES PATENT OFFICE.

JOHN F. REARDON, OF ST. LOUIS, MISSOURI.

FAUCET.

Application filed January 12, 1922. Serial No. 528,718.

*To all whom it may concern:*

Be it known that I, JOHN F. REARDON, a citizen of the United States, residing at the city of St. Louis and State of Missouri, have invented a new and useful Faucet, of which the following is a specification.

This invention relates to faucets, and has special reference to the construction and mounting of the stem for operating the valve.

An object of the invention is to improve generally the construction and arrangement of the stem to prevent the stem from becoming worn and the parts from becoming loose, in order to prolong the life of the device and to eliminate the necessity of frequent repairs.

Other objects will appear from the following description, reference being made to the drawing in which—

Figure 1:
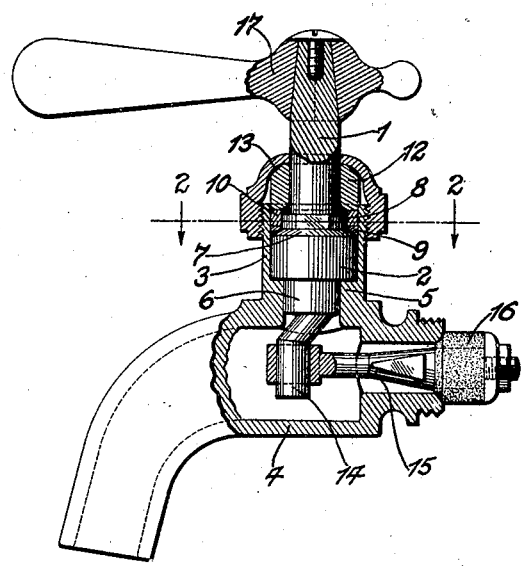
Fig. 1 is a sectional view of a faucet having my invention embodied therein.

The present invention resides wholly in the construction, arrangement and relationship of the valve stem and the associated parts. As shown, the stem 1 is formed with a relatively long integral or rigid enlarged cylindrical portion 2 that fits properly for turning movements in a gland chamber or barrel 3 extending from the body 4 of the faucet. The enlarged cylindrical portion 2 seats upon a shoulder 5 within which a cylindrical portion 6 of the stem is arranged to rotate. The portion 6 is of less diameter than the large cylindrical portion 2, but preferably does not extend into the opening through the faucet body 4.

An essential part of the present invention is the provision of the relatively long cylindrical portion 2 so that it has lateral bearing against the inner surface of the gland chamber or barrel 3 for relatively a considerable distance. This gives proper bearing for the valve stem and prevents lateral stresses and strains from being exerted upon the other parts of the structure when the stem is operated. In practice I have found that this construction is highly important and advantageous in this particular, for that it greatly prolongs the life of the structure beyond the period which it would endure or last if the long cylindrical part 2 is made of short length as usual.

The upper end of the cylindrical part 2 is preferably formed with an inclined or conical wall 7 terminating at the base of a part 8, which is of greater diameter than the diameter of the body of the valve stem and which is of less diameter than the diameter of the part 2 so as to leave a space between the part 8 and the wall of the gland chamber or barrel 3. In said space around the portion 8 upon the sloping upper wall 7 of the cylindrical part 2 a compressible packing ring 9 is located.

Figure 2:
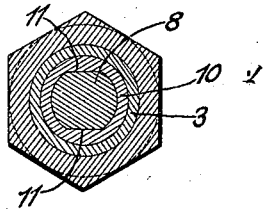
Fig. 2 is a cross sectional view on the line 2—2 of Fig. 1.

A metallic ring 10 encircles the part 8 and has interlocking connection such as 11 (Fig. 2) with the part 8 of the valve stem. This requires the ring 10 and the packing 9 to turn with the valve stem, thus preventing relative wear as between said parts. In this way the ring 10, which compresses the packing 9, is interlocked with the valve stem and forms a practical continuation or extension of the cylindrical bearing body 2. A collar 12 encircles the valve stem 1 above the ring 10 and extends a slight distance into the gland chamber or barrel 3. The collar 12 presses against the ring 10 and is itself pressed to position by a cap 13 which screws onto the end of the barrel 3.

The lower end of the valve stem is provided with the usual crank 14 to which the stem 15 of the Fuller ball 16 is connected. The valve stem is equipped with any appropriate operating handle 17.

From the foregoing it will be seen that my invention is a praticable one. The construction shown and described holds the valve stem in proper adjustment at all times, preventing lateral oscillation or vibration thereof, and prevents the wearing of the parts which has heretofore been one of the great difficulties in the case of valves of this type not having the parts described. The relatively long cylindrical bearing body 2 is one of the essential features of the invention, and highly important features of the invention reside in the presence and relationship of the packing 9 and the ring 10 interlocked with the valve stem so that they are required to turn with the valve stem. The practical advantages of this invention have been demonstrated by actual use.

What I claim and desire to secure by Letters Patent, is:—

1. In a faucet having a gland chamber, a metallic valve stem extending through the gland chamber into the faucet, a relatively long and large cylindrical portion integral with the valve stem fitting within the gland chamber to hold the valve stem from lateral vibration, a packing compressed within the gland chamber above said cylindrical portion and around the valve stem, and means for causing the packing to turn with the valve stem.

2. In a faucet having a gland chamber, a metallic valve stem extending through the gland chamber into the faucet, a relatively long and large cylindrical portion integral with the valve stem fitting within the gland chamber to hold the valve stem from lateral vibration, a packing compressed within the gland chamber above said cylindrical portion and around the valve stem, and a device interlocked and turning with the valve stem compressing the packing in position.

3. In a faucet, a gland chamber opening into the faucet, a shoulder at the bottom of the gland chamber around the opening into the faucet, a metallic valve stem extending through the gland chamber into the faucet, a relatively long cylindrical body portion integral with the valve stem fitting within the gland chamber and seating on said shoulder, and being of sufficient length to hold the valve stem from lateral vibration and having a sloping shoulder at its upper end, packing compressed in the gland chamber against said sloping shoulder, and an element interlocked and turning with said valve stem for causing the packing to turn with said stem.

4. In a faucet, a gland chamber opening into the faucet, a shoulder at the bottom of the gland chamber around the opening into the faucet, a metallic valve stem extending through the gland chamber into the faucet, a relatively long cylindrical body portion integral with the valve stem fitting within the gland chamber and seating on said shoulder, and being of sufficient length to hold the valve stem from lateral vibration, packing compressed in the gland chamber above said body portion, and means interlocked and turning with the valve stem compressing the packing in position.

JOHN F. REARDON.